(12) United States Patent
Wang-Lee

(10) Patent No.: US 8,070,287 B1
(45) Date of Patent: Dec. 6, 2011

(54) COLLAPSIBLE EYEGLASS STRUCTURE

(75) Inventor: Tzu-Feng Wang-Lee, Rende Township, Tainan County (TW)

(73) Assignee: Jiann Lih Optical Co., Ltd., Tainan County (TW)

( * ) Notice: Subject to any disclaimer, the term of this patent is extended or adjusted under 35 U.S.C. 154(b) by 16 days.

(21) Appl. No.: 12/835,776

(22) Filed: Jul. 14, 2010

(51) Int. Cl.
*G02C 5/14* (2006.01)

(52) U.S. Cl. ............. 351/120; 351/63; 351/153; 16/228

(58) Field of Classification Search ............. 351/63, 351/111, 120, 121, 153; 16/228; 2/454
See application file for complete search history.

(56) References Cited

U.S. PATENT DOCUMENTS

| | | | |
|---|---|---|---|
| 6,755,523 B1 | 6/2004 | Wiedner | |
| 7,070,273 B2 * | 7/2006 | Benavides et al. | 351/115 |
| 7,144,109 B2 | 12/2006 | Bruck | |

* cited by examiner

*Primary Examiner* — Huy K Mai
(74) *Attorney, Agent, or Firm* — Alan Kamrath; Kamrath & Associates PA

(57) ABSTRACT

A collapsible eyeglass structure includes a frame bilaterally provided with two temples. The frame has two ends, each having an inner side formed with a through hole. Each through hole has an entrance end with a beveled rim and an opposite end connected to an inwardly expanding receiving space. Each receiving space has a predetermined shape and an upper wall formed with plural teeth. Each temple has a pivotal connecting portion outwardly extended with a post. Each post has a convex tip and is notched so as to be pushed resiliently into the corresponding through hole of the frame. Each post further has an upper periphery formed with a tooth. When the posts are pushed into the receiving spaces in the frame respectively, the tooth of each post meshes with the corresponding teeth in the corresponding receiving space to allow angular adjustment or downward collapse of the temples.

1 Claim, 7 Drawing Sheets

COLLAPSIBLE EYEGLASS STRUCTURE

BACKGROUND OF THE INVENTION

1. Technical Field

The present invention relates to a collapsible eyeglass structure. More particularly, the present invention relates to a collapsible eyeglass structure wherein a frame mounted with a lens has two ends, each end having an inner side formed with a cavity of a predetermined configuration, and wherein each of two temples is outwardly extended with a toothed post corresponding in position to and insertable into one of the cavities such that the temples can be adjusted angularly for normal use or be folded downward into the inside of the frame when not in use.

2. Description of Related Art

Nowadays, eyeglass assemblies for different uses come in a variety of configurations. In particular, the structure between the lens(es) and the frame, between the lens-mounted frame and the temples, or between the lens-mounted frame and a strap is specifically designed to achieve the intended functions. For instance, U.S. Pat. No. 6,755,523 B1 issued on Jun. 29, 2004 and entitled "GLASSES" discloses a pair of glasses wherein a lens-mounted frame has two ends each having an inner side penetrated by a hole, and wherein each of two temples has a pivotal connecting end extended with a notched projection. The notched projections can be pushed resiliently into and positioned securely in the corresponding holes of the frame such that the two temples can be folded downward into the inside of the frame when not in use. U.S. Pat. No. 7,144,109 B2 issued on Dec. 5, 2006 and entitled "GLASSES" discloses another pair of glasses, wherein a lens-mounted frame has two ends each having an inner side formed with a projection, and wherein each of two temples which are respectively and pivotally connected to the two ends of the frame has a plurality of teeth for meshing with the corresponding projection, so as to enable angular adjustment of the temples.

BRIEF SUMMARY OF THE INVENTION

The present invention provides a novel design for the connecting configuration between a lens-mounted frame and two temples, wherein each temple has a pivotal connecting end outwardly extended with a post, and wherein the frame has two ends each having an inner side formed with an inwardly expanding cavity. The posts can be pushed into the cavities respectively, so as for a tooth at one end of the post of each temple to mesh with the corresponding ones of a plurality of teeth in the corresponding cavity of the frame. Thus, the two temples can be adjusted to the desired angles for normal use or be folded downward into the inside of the frame when not in use.

The primary object of the present invention is to provide a collapsible eyeglass structure including a lens-mounted frame and two temples. The frame has two ends each having an inner side formed with a through hole, wherein the through hole has one end formed as a circumferentially beveled entrance opening and an opposite end connected to an inwardly expanding receiving space. Each receiving space has a predetermined shape and an upper wall formed with a plurality of teeth. On the other hand, each temple has a pivotal connecting portion outwardly extended with a post, wherein the post has a convex tip and is formed with a notch so as to be pushed resiliently into the corresponding through hole of the frame. Each post further has an upper periphery formed with a tooth such that, when the posts are pushed respectively into the receiving spaces in the frame, the tooth of each post meshes with the corresponding teeth in the corresponding receiving space. Thus, the temples connected respectively to the two ends of the frame can be adjusted to the desired angles for normal use or be folded downward into the inside of the frame when not in use.

BRIEF DESCRIPTION OF THE SEVERAL VIEWS OF THE DRAWINGS

The invention as well as a preferred mode of use, further objects, and advantages thereof will be best understood by referring to the following detailed description of an illustrative embodiment in conjunction with the accompanying drawings, in which:

FIG. 6A is a partial detailed view of FIG. 6;

DETAILED DESCRIPTION OF THE INVENTION

Figure 2:
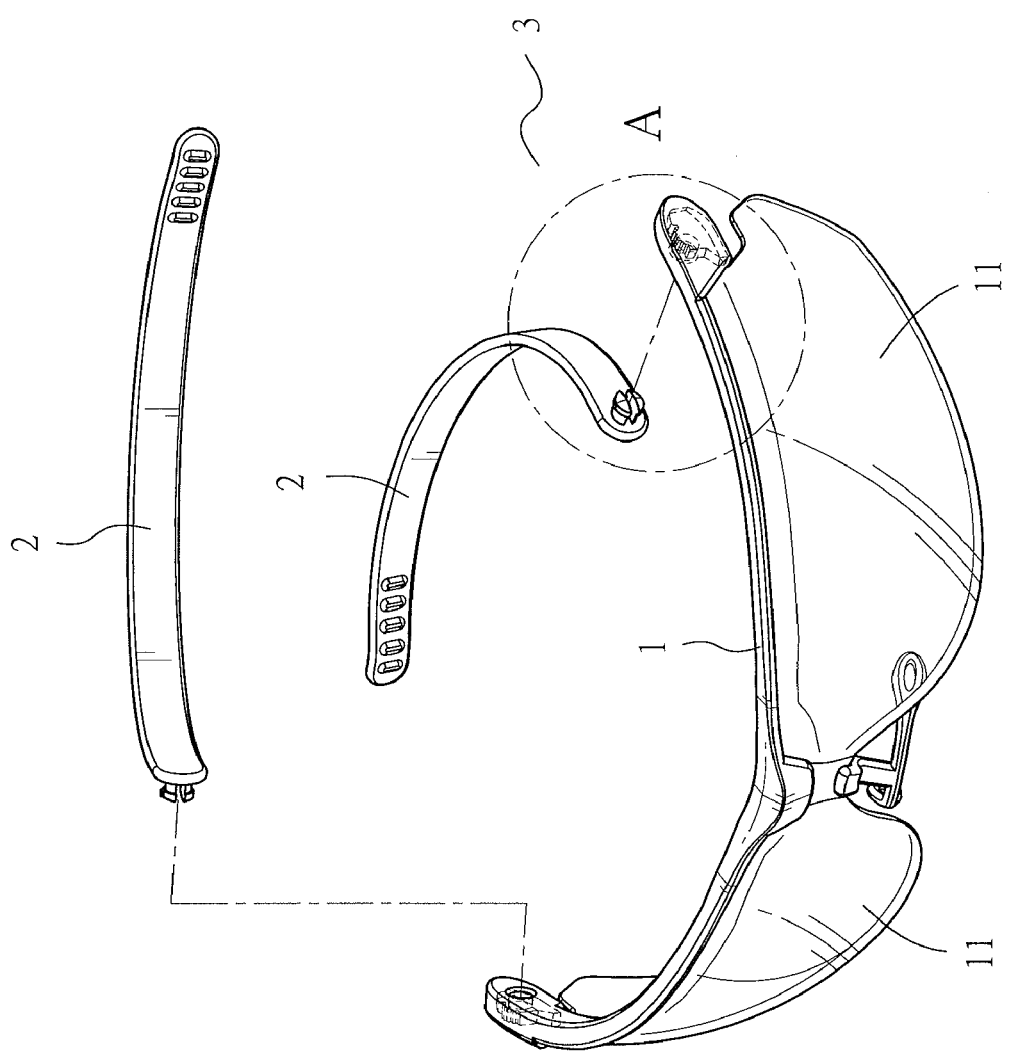
FIG. 2 is an exploded perspective view showing a lens-mounted frame and two temples of the present invention.

Referring to FIG. 2, a collapsible eyeglass structure of the present invention essentially includes: a frame 1 mounted with a lens 11, and two temples 2 connected to two ends of the frame 1 respectively.

Figure 2A:
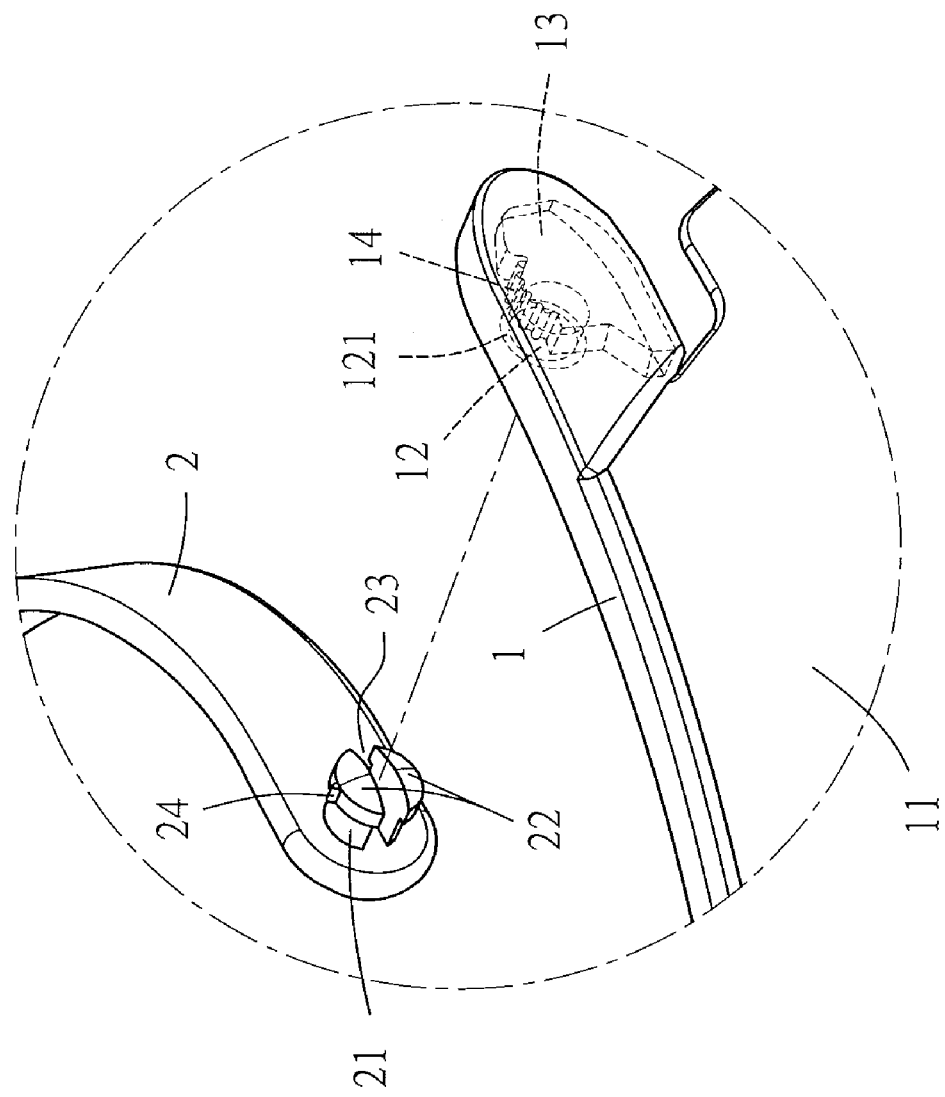
FIG. 2A is a partial detailed view of FIG. 2.

As shown in FIG. 2A, each of the two ends of the frame 1 has an inner side formed with a through hole 12. The through hole 12 has an entrance end provided with a beveled rim 121 and an opposite end connected to a receiving space 13, wherein the receiving space 13 expands inward and has a predetermined shape, as shown more clearly in FIG. 3. The receiving space 13 further has an upper wall formed with a plurality of teeth 14.

As shown in FIG. 2A, each temple 2 has a pivotal connecting portion outwardly extended with a post 21, wherein the post 21 has a tip formed with a convex surface 22 and is provided with a notch 23. Moreover, the post 21 has an upper periphery formed with a tooth 24.

Figure 1:
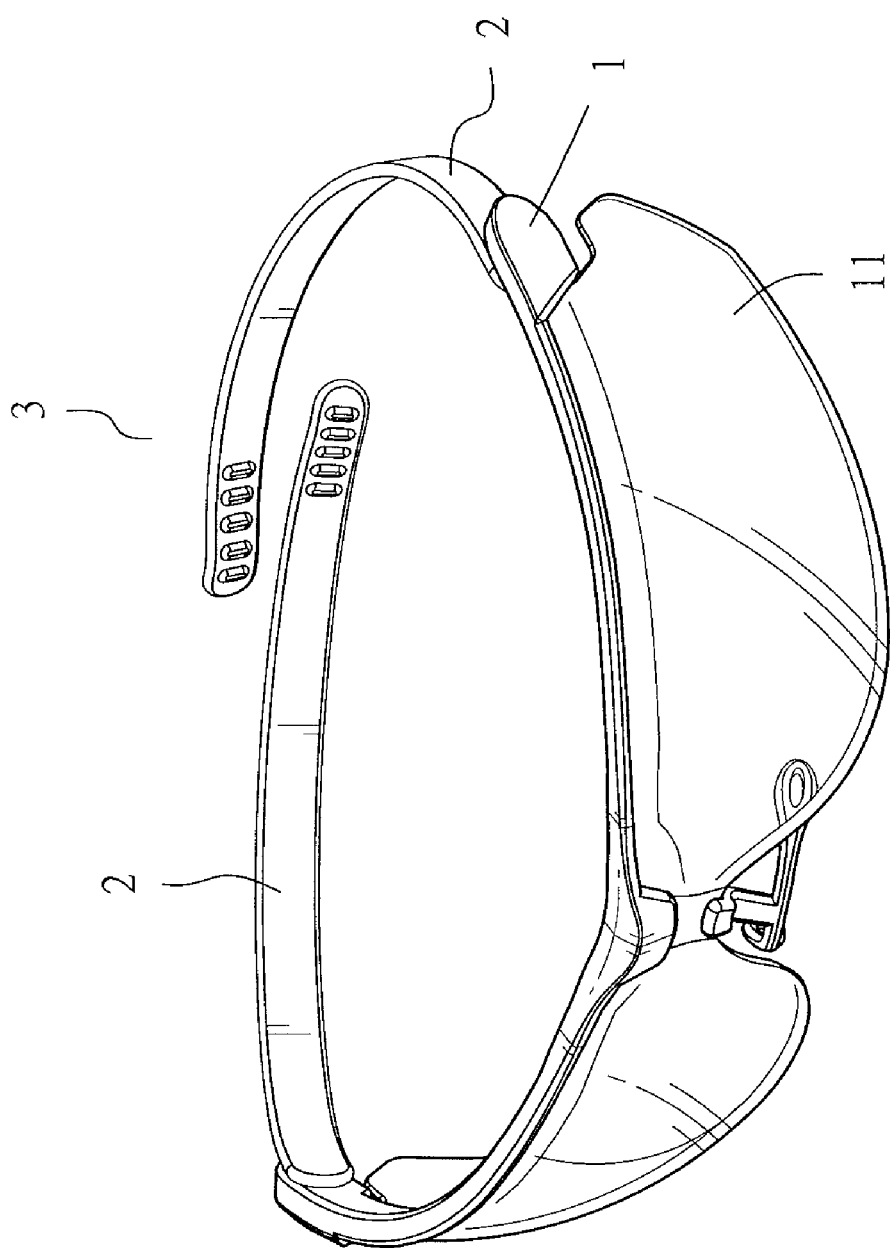
FIG. 1 is a perspective view of an eyeglass assembly according to the present invention.
Figure 4:
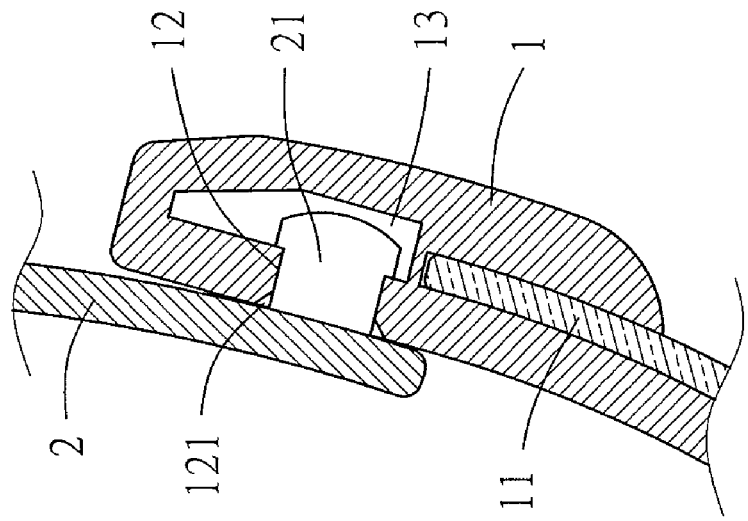
FIG. 4 is a top sectional view showing the frame and one temple of the present invention after assembly.
Figure 3:
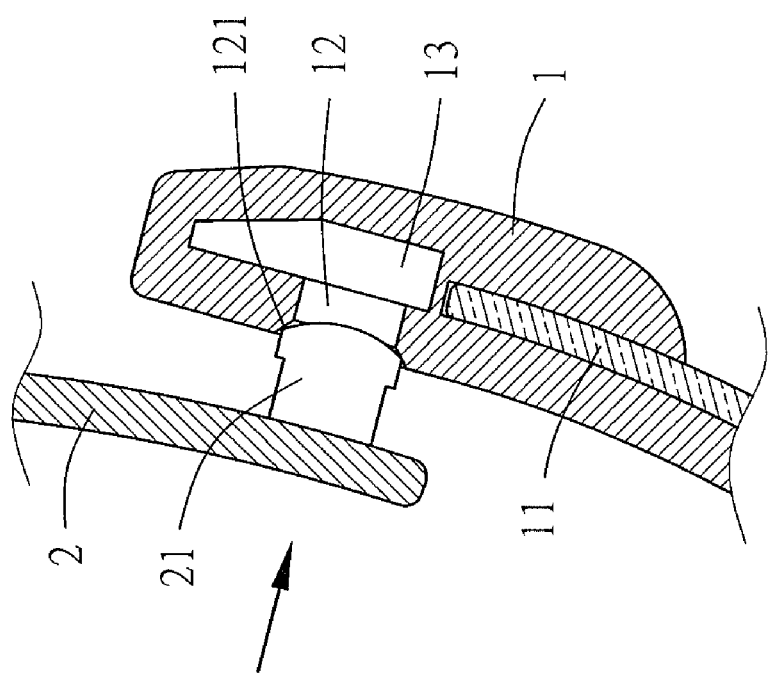
FIG. 3 is a top sectional view showing the frame and one temple of the present invention before assembly.
Figure 5:
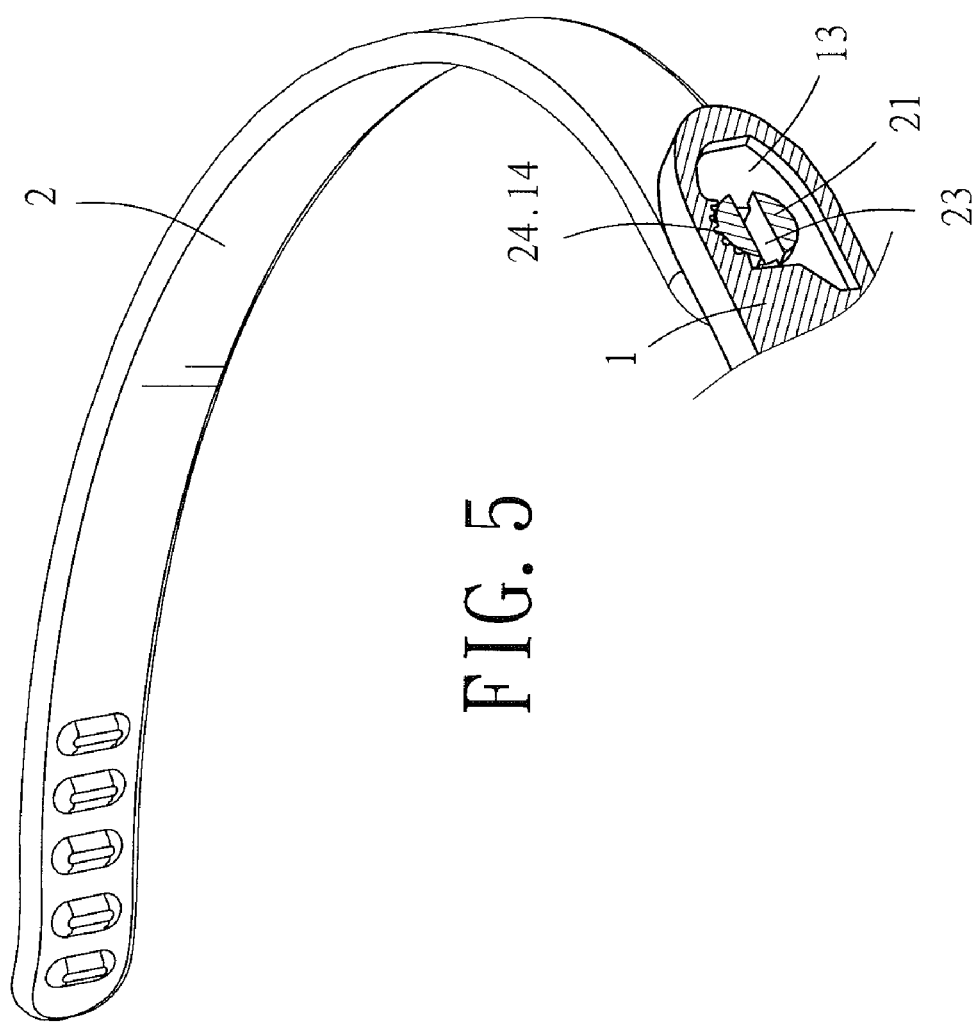
FIG. 5 is a partially sectional view showing the frame and one temple of the present invention after assembly.

Assembly of the frame 1 and the two temples 2 is described as follows. Referring to FIG. 3, the post 21 extending outward from the pivotal connecting portion of the temple 2 is aligned with and pushed inwardly against the through hole 12 of the frame 1 such that the convex surface 22 formed at the tip of the post 21 is pressed against the beveled rim 121 of the through hole 12. Then, by a slight inward push, the post 21 is inserted into the receiving space 13 in the frame 1, as shown in FIG. 4. At the same time, the tooth 24 at one end of the post 21 is also pushed into the receiving space 13, as shown in FIG. 5, to mesh with the corresponding ones of the plural teeth 14 in the receiving space 13. Thus, after the two temples 2 are connected to the frame 1, an eyeglass assembly 3 as shown in FIG. 1 is formed, with the connecting elements hidden from view.

Figure 6:
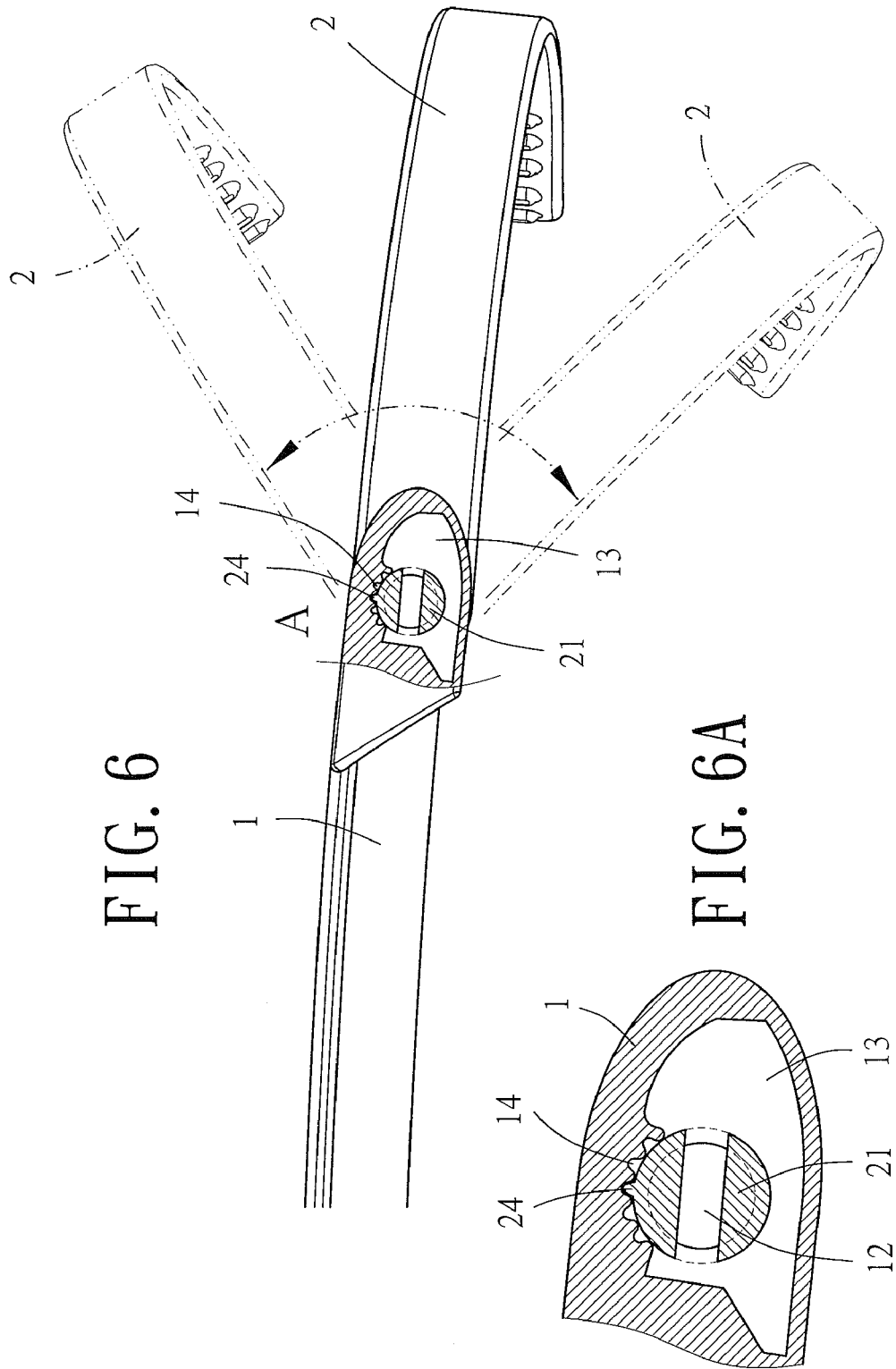
FIG. 6 illustrates angular adjustment of one temple of the present invention, wherein the temple is connected to the frame.

Angular adjustment of the temples 2 connected respectively to the two ends of the frame 1 is now explained with reference to FIG. 6. A user can rotate the two temples 2 upward or downward (as indicated by the arrows in FIG. 6) according to his or her facial shape and the desired position of the eyeglass assembly 3 such that the tooth 24 at one end of each temple 2 meshes successively with the corresponding teeth 14 in the corresponding receiving space 13, as shown in FIG. 6A. After the temples 2 are adjusted to the desired angles, the tooth 24 of each temple 2 is securely retained by the meshing teeth 14 in the corresponding receiving space 13.

Figure 7:
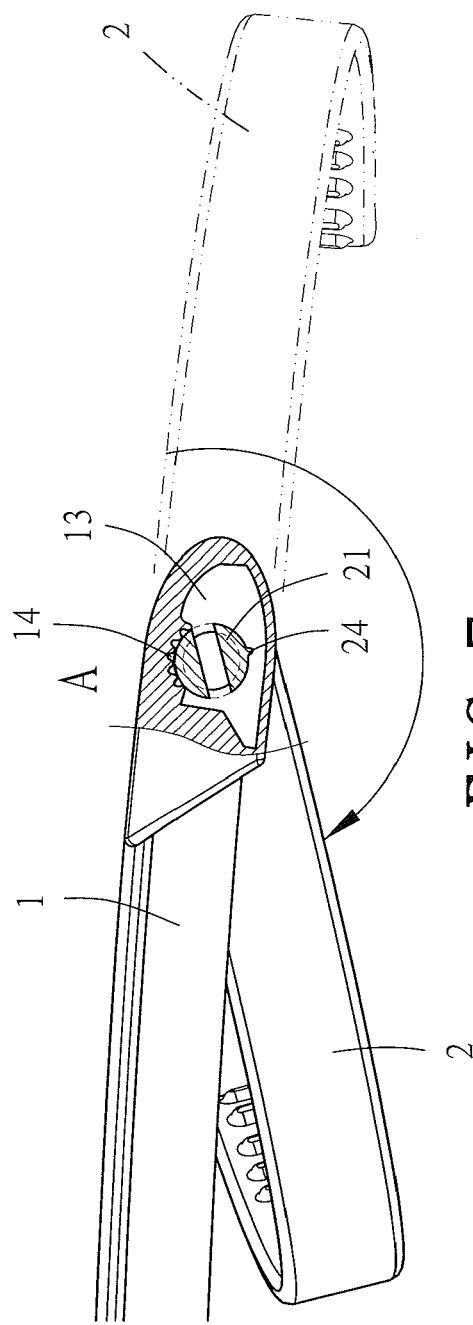
FIG. 7 illustrates downward collapse of one temple of the present invention, wherein the temple is connected to the frame.
Figure 7A:
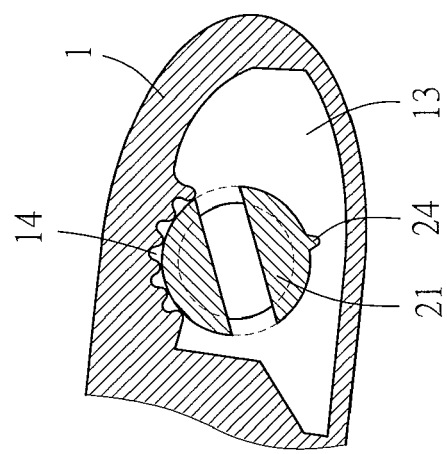
FIG. 7A is a partial detailed view of FIG. 7.

Referring to FIG. 7, when the temples 2 connected respectively to the two ends of the frame 1 are not in use, the two temples 2 can be directly rotated downward (as indicated by the arrow in FIG. 7) such that, after meshing successively with the teeth 14 in the corresponding receiving space 13, the tooth 24 at one end of each temple 2 is rotated further downward to an unrestrained state, as shown in FIG. 7A, thus allowing the two temples 2 to be folded into the inside of the frame 1, and the collapsed eyeglass assembly 3 to be easily put away in a pocket.

What is claimed is:

1. A collapsible eyeglass structure, comprising: a frame mounted with a lens, and two temples connected to two ends of the frame respectively, the collapsible eyeglass structure being characterized in that:

each said end of the frame has an inner side formed with a through hole, each said through hole having an entrance end provided with a beveled rim and an opposite end connected to an inwardly expanding receiving space, each said receiving space having a predetermined shape and an upper wall formed with a plurality of teeth; and each said temple has a pivotal connecting portion outwardly extended with a post, each said post having a convex tip and being formed with a notch so as to be pushed resiliently into a corresponding said through hole of the frame, each said post further having an upper periphery formed with a tooth such that, after the posts are pushed into the receiving spaces in the frame respectively, the tooth of each said post meshes with corresponding ones of the plural teeth in the corresponding receiving space;

wherein the temples connected respectively to the two ends of the frame can be adjusted angularly for normal use or be folded downward into an inside of the frame when not in use.

* * * * *